(12) United States Patent
Kim et al.

(10) Patent No.: US 7,524,535 B2
(45) Date of Patent: Apr. 28, 2009

(54) METHOD OF PROTECTING METALS FROM CORROSION USING THIOL COMPOUNDS

(75) Inventors: Hyung-Joon Kim, Pohang (KR); Jinming Zhang, Blacksburg, VA (US); Richard D. Gandour, Blacksburg, VA (US); Roy Hoan Yoon, Blacksburg, VA (US)

(73) Assignees: POSCO, Pohang-shi (KR); Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 10/786,379

(22) Filed: Feb. 25, 2004

(65) Prior Publication Data

US 2005/0186347 A1    Aug. 25, 2005

(51) Int. Cl.
*B05D 7/14* (2006.01)
(52) U.S. Cl. ............... 427/388.1; 427/388.4; 427/388.5
(58) Field of Classification Search ................. None
See application file for complete search history.

(56) References Cited

U.S. PATENT DOCUMENTS

| | | | |
|---|---|---|---|
| 3,300,333 A * | 1/1967 | Page | 427/11 |
| 5,108,793 A | 4/1992 | van Ooij et al. | 427/327 |
| 5,200,275 A | 4/1993 | van Ooij et al. | 428/623 |
| 5,292,549 A | 3/1994 | van Ooij et al. | 427/156 |
| 5,433,976 A | 7/1995 | van Ooij et al. | 427/327 |
| 5,487,792 A | 1/1996 | King et al. | 136/256 |
| 5,750,197 A | 5/1998 | van Ooij et al. | 427/318 |
| 5,759,629 A | 6/1998 | van Ooij et al. | 427/384 |
| 6,102,521 A | 8/2000 | Halko et al. | 347/47 |
| 6,183,815 B1 | 2/2001 | Enick et al. | 427/400 |
| 6,461,682 B1 | 10/2002 | Crotty et al. | 427/387 |
| 6,652,669 B1 * | 11/2003 | Reihs et al. | 148/241 |

FOREIGN PATENT DOCUMENTS

| | | | |
|---|---|---|---|
| JP | 57-198269 | * | 12/1982 |
| JP | 10-001784 | * | 1/1998 |
| JP | 10-001786 | * | 1/1998 |
| WO | WO 02/072283 A1 | | 9/2002 |

OTHER PUBLICATIONS

Ederth et al, Langmuir, 14, pp. 4782-4789, 1998.*
Translation of JP 10-001786, Jan. 1998.*
Translation of JP 57-198269, Dec. 1982.*
Ohno et al, Hyomen Kagaku, 18(6), pp. 373-379, 1997.*
Ruan et al, Thin Solid Films, 419, pp. 95-104, 2002.*
Nozawa et al, Corrosion Science, 39(9), pp. 1625-1639, 1997.*

(Continued)

*Primary Examiner*—Erma Cameron
(74) *Attorney, Agent, or Firm*—Grossman, Tucker, Perreault & Pfleger, PLLC

(57) ABSTRACT

This invention relates to a method of coating a metal surface by applying a solution containing an alkanethiol compound and a solvent to a metal surface, allowing the formation of a self-assembled monolayer, which presents as a robust barrier to corrosion. The alkanethiol compounds have a general formula, $R(CH_2)_nSH$, where R represents methyl, carboxyl, hydroxyl, formyl, or amide; n is in the range of 7 to 21, preferably in the range of 12 to 18.

9 Claims, 3 Drawing Sheets

OTHER PUBLICATIONS

Azzaroni, O., M. Cipollone, M.E. Vela and R.C. Salvarezza, Protective properties of dodecanthiol layers on copper surface: The effect of chloride anions in aqueous environments, Langmuir, 17 (2001), pp. 1483-1487.

Jennings, G.K. and Paul E. Laibinis, Self-assembled monolayers of alkanethiol on copper provide corrosion resistance in aqueous environments, Colloids and Surface A: Physicochemical and Engineering Aspects, 116 (1996), pp. 105-114.

Nozawa, K., H. Nishihara and K. Aramaki, Chemical Modification of Alkanethiol Monolayer for Protecting Iron Against Corrosion, Corrosion Science, 39 (1997), pp. 1625-1639.

Nozawa, K. and K. Aramaki, One- and two-dimensional polymer films of modified alkanethiol monolayers for preventing iron from corrosion, Corrosion Science, 41 (1999), pp. 57-73.

Sherer, J., M.R. Vogt, O.M. Magnussen and R.J. Behm, Corrosion of alkanethiol-covered Cu(100) surfaces in hydrochloric acid solution studied by in-situ scanning tunneling microscopy, Langmuir, 13 (1997), pp. 7045-7051.

Taneichi, D., Reiko Haneda and Kunitsugu Aramaki, A novel modification of an alkanethiol self-assembled monolayer with alkylisocynates to prepare protective films against copper corrosion, Corrosion Science, 43 (2001), pp. 1589-1600.

Zamborini, F.P. and R.M. Crooks, Corrosion passivation of gold by n-alkanethiol self-assembled monolayers: Effect of chain length and end group, Langmuir, 14 (1998), pp. 3279-3286.

van Ooij, W.J. and T. Child, Protecting Metals with Silane Coupling Agents, Chemtech, 1998, pp. 26-35.

\* cited by examiner

METHOD OF PROTECTING METALS FROM CORROSION USING THIOL COMPOUNDS

FIELD OF THE INVENTION

This invention pertains to a method of forming an ultrathin coating on metal surface with thiol compounds for the purpose of corrosion protection.

BACKGROUND OF THE INVENTION

Thermodynamically, most metals are stable only under reducing conditions and corrode upon exposure to an oxidizing ambient. According to National Association of Corrosion Engineers, it costs the U.S. households, businesses, and government agencies $300 billion annually to address the problems caused by corrosion. Metals producers combat this problem using various methods. Steel producers use various organic and inorganic coatings to protect cold-rolled steel (CRS) sheets from corrosion during shipment and storage. Some coatings are designed to control the electrochemistry of corrosion, while others such as conversion and organic coatings create physical barriers to retard the corrosion rate in an oxidizing environment.

Traditionally, conversion coatings are produced by exposing CRS to phosphoric acid (phosphating) or chromic acid (chromating) or both. The latter provides more effective corrosion protection. However, concerns for the toxicity of chromium salts have generated considerable interest in developing chrome-free conversion coatings. Most new developments are based on organic coatings, which also protect steel from fingerprints that act as seats for corrosion.

Of the various chrome-free conversion coatings developed, perhaps the silane-coupling agents have received the most attention. These reagents are designed, due to their unique molecular structure, to bond strongly to metal substrates on one side and to organic topcoats on the other. Many conversion coatings formed by silane coupling agents are comparable or better than chrome conversion coatings and provide excellent seats for paint adhesion.

Van Ooij, et al. (U.S. Pat. No. 5,108,793 and No. 5,200,275) disclosed methods of rinsing a steel sheet for about 30 seconds in an alkaline solution containing 50 mM sodium silicate and 5 mM $Ba(NO_3)_2$, or $Ca(NO_3)_2$, or $Sr(NO_3)_2$ at an elevated temperature (>45° C.) and pH (<10). The steel sheet is then dried to form a relatively insoluble silicate coating, which is subsequently rinsed with a solution containing 0.5~5.0% silane by volume.

Van Ooij, et al. (U.S. Pat. No. 5,292,549, No. 5,433,976 and No. 5,750,197) also disclosed a method of using both a crosslinking silane and a functionalized silane to treat a metallic substrate. The crosslinking silanes (or multifunctional silanes) are those that have silane groups at both ends of an alkyl chain. An example is 1,2-bis(triethoxysilyl)ethane (BTSE). Crosslinking silanes bond strongly to an inorganic substrate, while functionalized silanes adsorb on the top of the crosslinking silanes that have been adsorbed on the surface. In another U.S. patent, van Ooij, et al. (U.S. Pat. No. 5,759,629) disclosed a method of treating galvanized steel with vinyl silane (VS). It provides a high degree of paint adhesion and prevents delamination and underpaint corrosion.

Silanes adsorb on a metallic substrate (M) via hydrogen bonds initially, which can subsequently be transformed to covalent bonds (M-O—Si). The adsorbed silanes undergo cross-linking polymerization via siloxane bonding (Si—O—Si) between neighboring molecules. Both these bonding mechanisms contribute to large negative free energies of adsorption, which may contribute to the formation of robust surface coatings that can provide a strong barrier effect to corrosion.

In the instant invention, alkanethiols are adsorbed on galvanized CRS sheets to increase their resistance to corrosion. The thiol group (—SH) can react strongly with a metallic substrate (M) in an aqueous medium and form strong metal-sulfur (M-S) covalent bonds, while the alkyl chains can be associated with each other to form a close-packed monolayer of hydrocarbon chains. The attraction between hydrocarbon chains is often referred to as hydrophobic bonding. A monolayer of surfactant formed by the hydrophobic bonding mechanism is known as self-assembled monolayer (SAM). Both the covalent bonding and hydrophobic bonding mechanisms contribute to the formation of robust surface coatings that can provide a barrier effect. In general, the longer the alkane hydrocarbon chain length is, the stronger is the barrier effect to corrosion. When methyl ($CH_3$) group is the terminal group of the hydrocarbon chain, the coated surface becomes hydrophobic, which should help prevent fingerprint formation. By substituting the methyl group with other functional groups such as —OH, —$NH_2$, —COOH, etc., one can modify the affinity of the coated surface to a top coat. By using a polymerizable terminal group, one can further increase the barrier effect.

Zamborini and Crooks (1998) studied the ability of n-alkanethiol SAMs to protect gold from corrosion in aqueous bromide solutions. According to their voltammetry studies, corrosion resistance increased with increasing thickness for a given alkanethiol. With alkanethiols of approximately the same chain length, corrosion resistance varied with the terminal group, the corrosion resistance decreasing in the order of OH>COOH>$CH_3$.

Scherer, et al. (1997) studied the corrosion of Cu(100) surface coated with alkanethiols with carbon numbers. (n) in the range of 8 to 16. The study was carried out in a 1-mM HCl solution using an in-situ scanning tunneling microscope (STM) and electrochemical techniques. They showed that the thiol coating inhibited the nucleation and growth of corrosion sites. When unprotected Cu(100) was allowed to oxidize, copper dissolved into solution layer-by-layer. When the surface was coated with a thiol, corrosion started as pits.

Azzaroni, et al. (2000) reported that the SAM of alkanethiol (n=12) hindered copper oxide formation and copper dissolution in electrolyte solutions containing chloride anions. They found that the corrosion inhibition varied with the electrode potential and the concentration of the aggressive anions.

Jennings, et al. (1996) coated silicon wafers with copper films, which were then coated with SAMs of alkanethiols. They showed that the monolayer films provided a barrier against the penetration of water and, thereby, increased corrosion resistance. In general, corrosion rate increased with increasing film thickness, which in turn varied with chain length. For example, the thickness was 1 nm when an alkanethiol with eight carbons (C-8) was used, and 3 nm when C-22 thiol was used. As a means of further increasing the thickness, the copper film was first coated with mercaptoalcohols ($HS(CH_2)_nOH$) with n=11 and 22 and then coated with an alkyltrichlorosilane ($CH_3(CH_2)_{17}SiCl_3$). However, the bilayer films were not effective in improving corrosion resistance.

Nozawa (1997, 1999), on the other hand, showed that bilayer coatings greatly increased corrosion resistance of iron. A monolayer coating of iron with 1-octadecanethiol (ODT) increased the protective efficiency by 76.3% as measured from impedance measurements in a 0.5 M NaCl solution. The iron surface was coated first by 11-mercapto-1-undecanol (MUO) and subsequently by triethoxyoctylsilane to achieve an 88.0% increased in protective efficiency. When the MUO-coated surface was coated again with 1,2-bis(triethoxysilyl)ethane (BTSE) and subsequently with $5 \times 10^{-4}$ M of triethoxyoctadecylsilane, the efficiency was increased by 98.1%. Teneichi, et al. (2001) modified the MUO SAM with alkylisocynate ($CnH_{2n+1}$ NCO) for the protection of copper in an aerated solution of 0.5 M $Na_2SO_4$. Protective efficiencies increased by 94.7 and 95.4% with octyl and octadecylisocyanate, respectively.

Halko, et al. (U.S. Pat. No. 6,102,521) disclosed a technique of treating a gold-plated orifice of ink-jet pen with thiol-type SAMs to control the wettability of the surface. Such treatment helped reduce the accumulation of residual ink and, thereby, inhibited corrosion and contamination of the plate.

Enick and Beckman (U.S. Pat. No. 6,183,815) disclosed a method for coating a metal surface with an amide thiol to increase corrosion resistance. The coating reagents with a general formula, $F(CF_2)_m CONH(CH_2)_n SH$, where n and m vary in the range of 2-20, were effective for protecting various metals such as gold, silver, nickel, copper, brass, tin, iron, etc., but not for aluminum and its alloys.

King, et al. (U.S. Pat. No. 5,487,792) used SAMs of 12-mercaptododecanoic acid to create a barrier effect and improve adhesion. The organized molecular assembly was impervious to water, alkali and other corrosive substances, and improved the adhesion of poly(methyl methacrylate) on silvered mirror surface.

Crottty, et al. (PCT WO 02/072283 A1) disclosed a method of treating metals, particularly aluminum or aluminum alloys with a solution comprising a mercapto-substituted silane and then baking the metal to cure the coating. The authors stated, however, that their invention does not include zinc or zinc plated surfaces.

Although it is well know that SAMs of alkanethiols are effective for protecting various metals from corrosion, no prior art discussed above is designed to protect galvanized CRS sheets. The instant invention is effective with galvanized and electrogalvanized (EG) steels even when they are coated further with phosphate and/or polymeric resins.

SUMMARY OF THE INVENTION

The instant invention discloses methods of creating corrosion-resistant coatings of a few nanometers thickness on metal surfaces. Typically, a metallic object is immersed in a solution containing an alkanethiol dissolved in an organic solvent for a period of time to allow for the surfactant molecules to form a close-packed SAM on the metallic substrate. The metallic object is then dried in air either at room or elevated temperature to drive-off the solvent and consolidate the organic coating.

The coating method disclosed in the instant invention is particularly useful for protecting CRS sheets from corrosion. Typically, a CRS sheet is immersed in a solution containing an alkanethiol. In a preferred embodiment, ODT is dissolved in a short-chain alcohol such as ethanol, and used as a coating solution.

One end of the alkanethiol molecule is composed of sulfhydryl (—SH) group, while the other end, which is referred to as terminal group, is composed of other functional groups. If the alkanethiol-coated surface is to be subsequently coated with a resin or a paint that is basic in nature, a more acidic or less basic terminal group may be chosen to promote a stronger adhesion with the topcoat. If the topcoat is acidic, a more basic functional group may be chosen. If a methyl group is chosen as the terminal group, the coated surface tends to become hydrophobic, which makes it conducive for producing a fingerprint-free coating.

The sulfhydryl group is capable of forming strong covalent bonds with metallic substrates such as iron and zinc. Also, the long hydrocarbon chains adsorbing on the surface associate with each other spontaneously via hydrophobic bonding, resulting in the formation of close-packed monolayer of hydrocarbon chains. Both the covalent and hydrophobic bonding causes the free energy of the system to decrease, resulting in the formation of SAMs. The close-packed monolayer of hydrocarbon chains prevents diffusion of water molecules, oxidants, and electrolytes, and thereby provides a barrier effect, which is essential for corrosion protection. In general, the longer the hydrocarbon chains, the stronger the barrier effect. Furthermore, one can select the terminal group so that the metallic substrate coated with a SAM would have a strong affinity for the material that is used for topcoat. Thus, the alkanethiols disclosed in the instant invention have advantages not only in providing robust adhesive bonding with substrate and a strong barrier effect, but also a strong affinity for topcoats. All of these contribute to achieving a stronger corrosion protection.

Long-chain alkanethiols, particularly those with methyl terminal groups, are insoluble in water. In this case, appropriate solvents may be used to carry the alkanethiols to the surface of a metal that is to be protected from corrosion, and readily form SAMs on the surface. When using short-chain alkanethiols, particularly those with polar terminal groups, water may be used as solvents. For alkanethiols with intermediate chain lengths, a blend of an organic solvent and water may be used.

An advantage of using alkanethiols for corrosion protection is that these reagents can readily form SAMs on metallic substrates without requiring a long reaction time. When using 1-octadecanethiol, a preferred solvent is ethanol. In this case, the immersion time required for electrogalvanized steel is less than 15 seconds.

In the instant invention, the alkanethiols are used to increase the corrosion resistance of galvanized (or electrogalvanized) steels. They can also be used to increase the corrosion resistance of phosphated galvanized steels and the galvanized steels that have been coated with resins.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
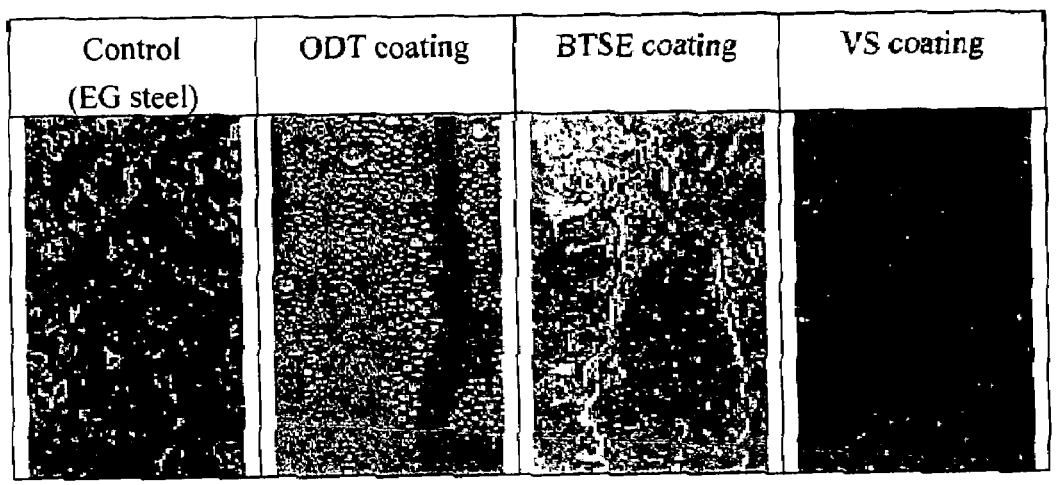
FIG. 1 shows the photographs of EG steel panels after 60 hours of salt spray tests. The unprotected panel (EG steel) shows red rust, while the EG steel coated with 1-octadecanethiol (ODT) shows no rust. The water droplets on the surface indicate that the ODT-coated surface was hydrophobic. The EG steel panels coated with BTSE or VS show white rust.

A preferred embodiment of the present invention will hereinafter be described in detail with reference to the accompanying drawings.

According to the instant invention, a coating solution comprising an alkanethiol dissolved in an organic solvent is applied to a metal surface. This coating acts as a protective film for the metal.

The anti-corrosive thiol coatings as disclosed in the instant invention can provide corrosion resistance for a variety of metallic substrates such as iron, steel, aluminum, copper, zinc, tin, gold and silver. In the steel industry, the thiol coatings can be applied to (but not necessarily limited to) hot rolled and pickled steel sheet, CRS sheets, hot-dipped or electroplated metal-coated steel sheets, and painted steel sheets. The metallic coating may include one or more layers of lead, lead alloy, nickel, nickel alloy, zinc, zinc layer, tin, tin alloy, and the likes. Sheet is meant to include continuous strips or foils of the metallic substrate and those cut to lengths. The painted steel sheets include phosphate conversion coatings applied to steel, metal-plated steel sheet, and resin-coated steel sheets. The invention has particular utility for electrogalvanized (EG) CRS sheets.

In a preferred embodiment, the thiol compounds that are used to form protective coatings on metal substrates comprise alkanethiols whose general formula is $R(CH_2)_n$—SH, where R is referred to as terminal group, which includes but not limited to methyl (—$CH_3$), amino (—$NH_2$), carboxy (—COOH), carboxylato (—COO—), hydroxy (—OH), amido (—$CONH_2$), formyl (—COH), and others. The subscript n represents the number of carbons in the alkane chain, which are in the range of 7 to 21, preferably in the range of 12 to 18. A particularly preferred embodiment of the present invention is ODT whose formula is $CH_3(CH_2)_{17}SH$. Because of the long hydrocarbon chains, the alkanethiols form SAMs, which can provide a barrier effect and, hence, a strong corrosion protection.

Alkanethiols such as ODT with a methyl terminal group can produce a hydrophobic coating with low surface free energy, while alkanethiols terminated with amino, carboxyl and hydroxyl groups usually produce relatively high-energy surfaces, which are conducive to adhering to topcoats such as resin and paint. The choice of the terminal groups can be made depending on the nature of the topcoat. If the topcoat is basic, the terminal group of the alkanethiol can be chosen such that it is acidic, or vice versa.

Solubility of alkanethiols varies depending on the molecular structure, solvents, and temperature. Preferred solvents are those that are nontoxic, inexpensive, and easy to handle. The preferred solvents include, but not necessarily limited to, alcohols, glycols, acetone, toluene, ethyl acetate, hexane, furan, tetrahydrofuran (THF), methylene chloride, ethers, formic acid, formamide, N,N-dimethyl formamide, acetonitrile, alkanes, turpentine, benzene, ethyl or butyl acetate, petroleum ester, xylene, carbon tetrachloride, mineral spirits, and water, or combinations thereof. Solvents containing straight hydrocarbon chains are preferred, as they are less disruptive than those with cyclic or branched hydrocarbons in creating SAMs of alkanethiols on metallic substrates.

The alkanethiol solutions of the present invention may be applied to a metallic surface by any known coating technique, including spray, painting, immersion, roll coating, or flow coating techniques. Immersion is the most preferred method because it allows the formation of SAMs without mechanical disturbance.

A metallic surface should be clean and contamination-free. It is necessary to remove any grease, oil or dirt from the surface. Surface oxidation of metallic substrates due to prolonged exposure to air is detrimental to the formation of robust SAMs of alkanethiols. Therefore, it is desirable to coat a metallic substrate as soon as it is produced. If necessary, it is desirable to remove the superficial oxidation products from the surface before coating the surface with an alkanethiol as disclosed in the instant invention.

An important parameter of the instant invention is the concentration of the alkanethiols in solution. It is necessary to have a high enough concentration so that a close-packed monolayer is formed on a metallic substrate with a short immersion time. The minimum concentration of the alkanethiols required is about 1 mM, and there are no advantages to increasing the concentration above 500 mM. In a preferred embodiment, alkanethiol solutions in the range of 20 to 50 mM are used. For the case of using ODT as coating materials for CRS, the thickness of the coatings is typically in the range of 2 to 3 μm.

An advantage of the instant invention is that the time required to produce a closed-packed SAM of alkanethiol on metallic substrate is relatively short. Theoretically, immersion times can be anywhere between a few seconds and many hours. However, a coating time longer than 15 seconds generally does not lend itself practicable in steel mills. In most laboratory tests conducted in the instant invention, dipping times in the range of 1 to 5 minutes were used. It has been shown, however, that dipping times in the range of 3 to 11 seconds are satisfactory for the case of coating CRS sheets with ODT in ethanol solutions. After the coating, the coated surface can be dried in air via evaporation either at room temperature or at elevated temperature, or dried with air or nitrogen stream. If the coated surface is thermally dried, the temperature should be below the melting or combustion point of the coated material. At temperatures in the range of 60 to 180° C., drying and curing process can be complete within a period of 10 seconds to a few minutes.

By way of examples, the instant invention is described in details as follows:

EXAMPLE 1

In this example, an electro-galvanized (EG) cold-rolled steel (CRS) prepared by Pohang Iron and Steel Company (POSCO) was cut to a small panel with dimensions of 12×7.5 cm. It was coated with 1-octadecanethiol, which can readily form closed-packed SAMs on the zinc-coated steel surface due to the long hydrocarbon chains. The coating was done by immersing the CRS panel in a 0.05 M ODT-in-ethanol (absolute alcohol) solution for 5 minutes. The coated surface was then dried in an oven at 120° C. for 5 minutes. The coating exhibited a light gray color. The coated surface was highly hydrophobic, indicating that the terminal $CH_3$-groups were pointed away from the surface. As shown in Table 1, the water contact angle increased from 72 to 124° due to the coating, and the surface free energy of the coated surface decreased from 45.24 to 34.63 $mJ/m^2$. Tafel studies showed that the ODT coating decreased corrosion current substantially from 49.04 to 8.78 $\mu A/cm^2$, which was an indication that the ODT coating greatly increased the corrosion resistance of the EG steel.

The coated CRS panel was subjected to salt-spray tests, by following the standard procedure as prescribed in ASTM-B117. For comparison, salt spray tests were also conducted on i) an untreated EG CRS panel and ii) a panel that had been coated with 1,2-bis(triethoxysilyl)ethane (BTSE), iii) and a panel that has been treated with triethoxyvinylsilane (VS). The silane coatings were applied by following the procedures described by van Ooij (U.S. Pat. Nos. 5,292,549; 5,750,197; 5,759,629).

FIG. 1 shows the photographs of the panels that have been treated under different conditions after 60 hours of salt spray tests. The untreated panel started rusting after only 2 to 4 hours in the fog chamber, while the ODT-coated panel remained intact after 50 to 60 hours. As shown, the ODT-coated panel shows water droplets on the surface, indicating that the surface is hydrophobic. The panels coated with ODT lasted longer than those that had been coated with BTSE and VS. It is been known that both BTSE and VS coatings on galvanized steel sheets are robust and provide excellent corrosion protection (Van Ooij and Child, 1998; U.S. Pat. No. 5,750,197, U.S. Pat. No. 5,292,549).

TABLE 1

Effects of Coating EG Steel with ODT

| Treatment | Water Contact Angle (deg.) | Surface Free Energy ($mJ/m^2$) | Corrosion Current ($\mu A/cm^2$) | Appearance of White Rust (hrs) |
|---|---|---|---|---|
| EG | 72 | 45.24 | 49.04 | 2~4 |
| EG + ODT | 124 | 34.63 | 8.78 | 50~60 |

EXAMPLE 2

Figure 2:
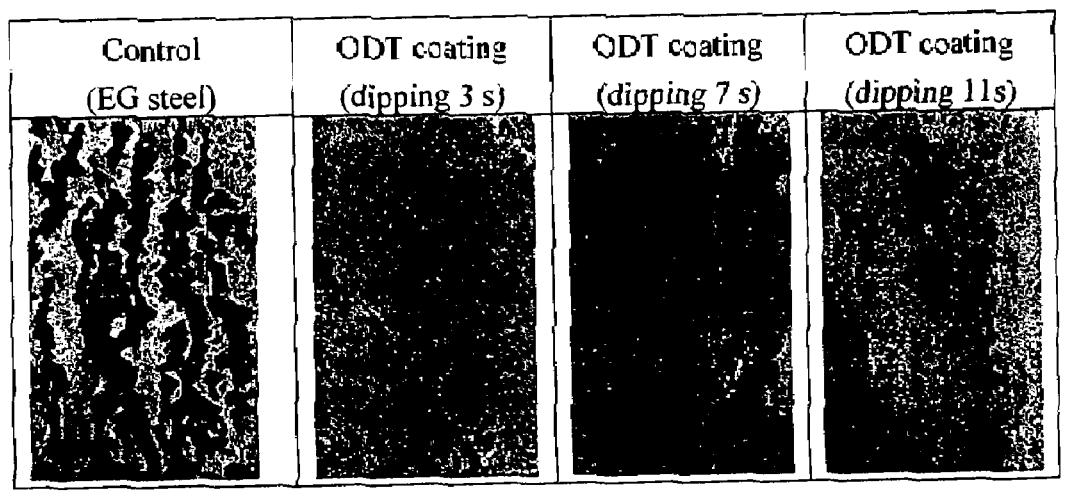
FIG. 2 shows the photographs of EG steel panels after 48 hours of salt spray tests. The unprotected panel (EG steel) shows red rust, while other panels coated with ODT under different dipping times show no significant rust.

In Example 1, the ODT coating was made by immersing an electrogalvanized CRS panel in a 50-mM ODT-in-ethanol solution for 5 minutes. It is difficult, however, to implement such a long immersion or dipping time in an operating plant. Therefore, it was necessary to conduct tests with much shorter dipping times. In Example 2, EG steel panels with dimension of 12×7.5 cm were immersed in 50-mM ODT-in-ethanol solutions for 3, 7 and 11 seconds. The coated panels were dried in an oven at 100° C. for 2 minutes, and subjected to salt spray tests. The untreated EG steel (control) started rusting in 2 to 4 hours, while the EG steel panels treated with ODT showed little signs of corrosion after 48 hours as shown in FIG. 2. That the EG steel panels treated for such short period of time still showed excellent corrosion resistance indicates that (a) ODT reacts quickly with zinc metal and (b) 10 seconds of dipping time would suffice in a production line.

EXAMPLE 3

Figure 3:
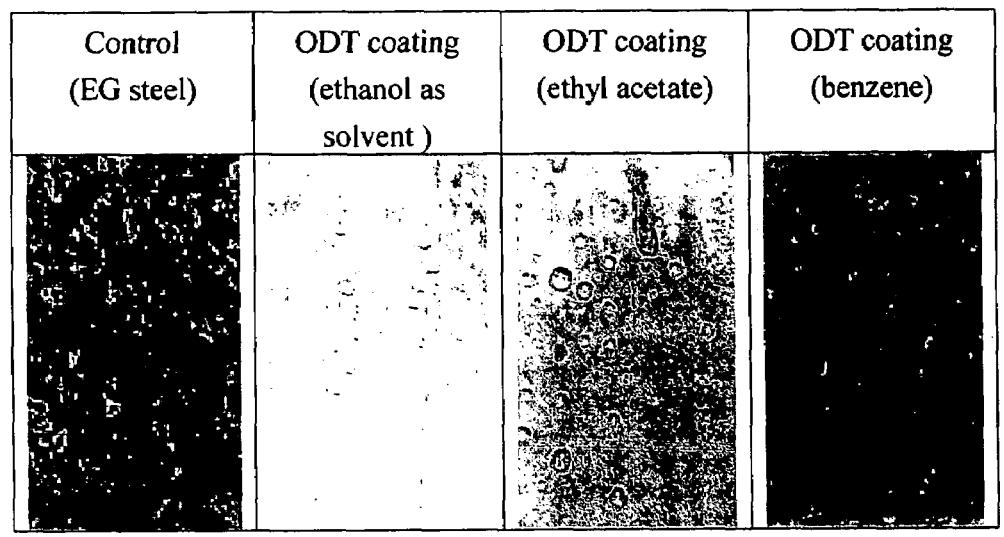
FIG. 3 shows the photographs of EG steel after 60 hours of salt spray tests. The unprotected panel (EG steel) shows red rust; the EG steel panels treated with ODT dissolved in ethanol or ethyl acetate show no rust, while the EG steel panel treated with ODT dissolved in benzene shows white rust.

In this Example, effects of using different solvents for ODT were investigated. Three different solvents, i.e., ethanol, ethyl acetate and benzene, were tested. In each experiment, a panel of EG steel was coated by dipping it in a 50-mM ODT solution for 5 minutes. The coated panel was dried in air for a few minutes to allow the solvents to evaporate. The ODT-coated panels, along with an untreated EG steel panel, were subjected to salt spray tests. FIG. 3 shows the photographs of the test panels after 60 hours of salt spray tests.

As shown, the panel coated with the ODT dissolved in benzene corroded faster than the others. The ODT dissolved in ethyl acetate gave reasonable protection, but the result was not as good as those obtained with ethanol as solvent. It is possible that a ring-structured solvent such as benzene may not be conducive for creating a close-packed SAM of long-chain surfactants such as ODT. A straight-chain alcohol such as ethanol and 1-butanol gave the best results.

EXAMPLE 4

In the examples shown heretofore, the technique of protecting a metal from corrosion as disclosed in the instant invention was applied to EG steel. In this example, an electorgalvanized and phosphated CRS steel panel was coated with an alkanethiol, and subjected to salt spray tests. The phosphated panels of 12×7.5 mm used in this example were obtained from POSCO. One panel was immersed in a 20-mM ODT-in-ethanol solution for 5 minutes, and dried in an oven at 100° C. for 5 minutes. Another panel was immersed in a 1% by volume VS solution for 1 minute, and then dried by blowing dry nitrogen gas over the coated surface. The phosphated panels were subjected to salt spray tests for 52 hours in a fog chamber. For comparison, an untreated phosphated panel and a chrome-rinsed phosphated EG steel panel were also placed in the same fog chamber.

Figure 4:
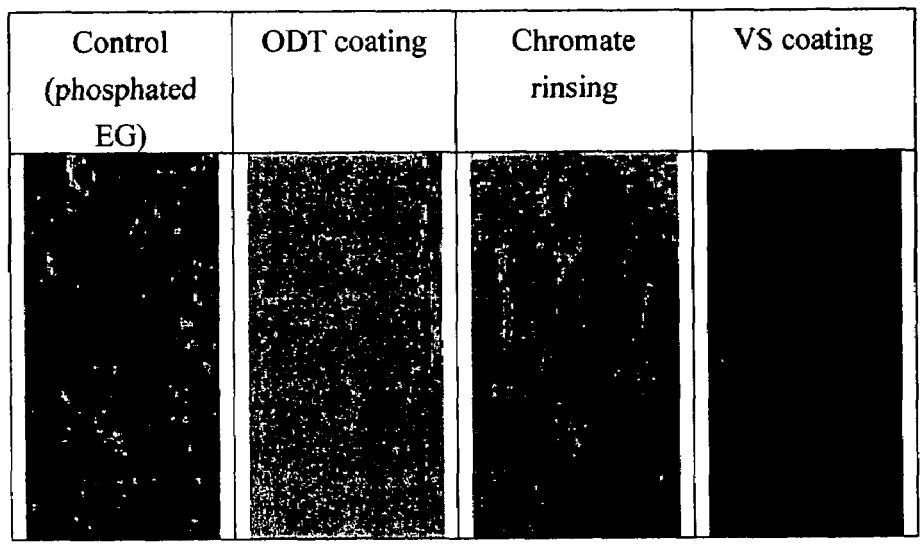
FIG. 4 shows the photographs of phosphated EG steel after 52 hours of salt spray tests. The unprotected phosphated panel shows red rust. The panel coated with ODT shows no significant rust. The panels treated with either chromate rinsing or vinyl silane (VS) coating shows heavy rust.

As shown in FIG. 4, the ODT-coated panel shows the least corrosion after 52 hours. Its performance was superior to those coated with chrome or VS. Thus, the technique of coating phosphated steel with an alkanethiol such as ODT can readily replace the conventional method of using chrome for corrosion protection. A distinct advantage of the instant invention is that neither the thiol nor the solvent used in this example is toxic.

EXAMPLE 5

Figure 5:
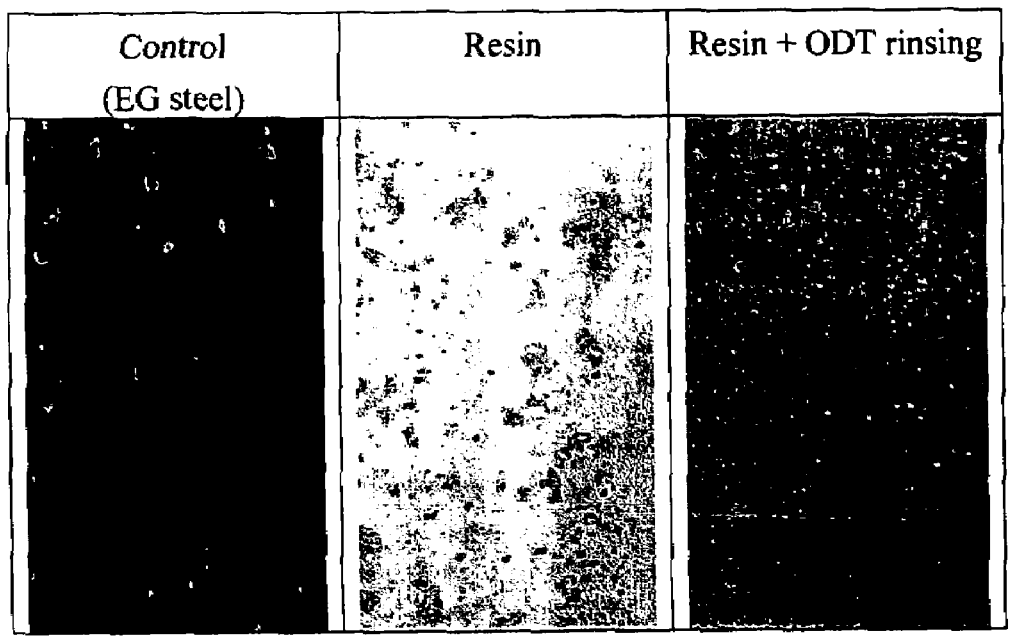
FIG. 5 shows the photographs of EG steel after 240 hours of salt spray tests. The unprotected panel (EG steel) shows red rust, while the EG steel coated with resin shows corroded spots. The EG steel panels coated with resin followed by ODT show almost no rust.
Figure 6:
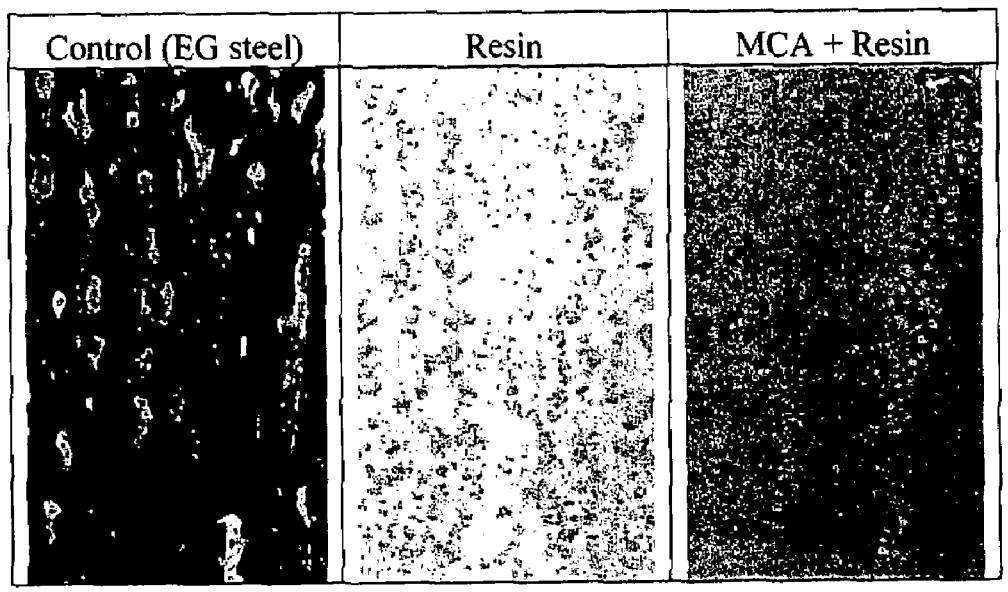
FIG. 6 shows the photographs of EG steel after 144 hours of salt spray tests. The unprotected panel (EG steel) shows red rust, while the EG steel coated with resin shows corroded spots. The EG steel panels coated with resin followed by 16-mercaptohexadecenoic acid (MCA) show almost no rust.

In this example, an alkanethiol was used to further improve the corrosion resistance of a resin coated EG steel. Two EG steel panels with dimensions of 12×7.5 mm were coated with a commercially used resin. A No. 5 bar coater was used to obtain 1-2 μm of thickness on the surface, and the coated panels were placed in an oven for 5 minutes at 150° C. One panel was then immersed in a 50-mM ODT-in-ethanol solution for 5 minutes and dried in air at room temperature. Both the resin-coated and resin/ODT-coated EG steel panels were placed in a fog chamber for salt spray tests. For comparison, an untreated EG steel panel was also subjected to the salt spray test. FIG. 5 shows the photographs of the panels after 240 hours in the fog chamber. The untreated EG steel showed red rusts. The EG steel panel coated with a commercial resin showed significant corrosion, while the rein followed by ODT coating showed no sign of rust. Thus, the results given in FIG. 5 demonstrate that the performance of a resin-coated EG steel can be further improved by an alkanethiol coating.

EXAMPLE 6

Another method of improving the corrosion resistance of resin-coated EG steel is disclosed in this example. An EG steel panel was coated first with an alkanethiol and subsequently with a resin. By choosing an alkanethiol with a polar terminal group, it was possible to increase the adhesion of the resin to the substrate and, hence, the resistance of the resin-coated steel to corrosion.

In this example, an EG steel panel with a dimension of 12×7.5 mm was immersed in a 20-mM 16-mercaptohexadecenoic acid (MCA) solution for 10 seconds. A 4:1 ethanol-water mixture was used as the solvent for the alkanethiol. The coated surface was dried in a stream of dry nitrogen gas and then in an oven at 120° C. for 5 minutes. The MCA-coated panel was coated again with a commercially used resin in the same manner as described in Example 5. Another EG steel panel was coated with a resin alone. Both the MCA/resin- and resin-coated EG steel panels were subjected to salt spray tests. FIG. 5 shows the photographs of the panels after 144 hours of salt spray tests. Also shown in this figure was the photograph of an untreated EG steel panel. As shown, both the control and resin-coated panels showed significant corrosion, but the MCA/resin-coated panel remained intact.

In this example, MCA was chosen because of its unique structure ($HS(CH_2)_{15}COOH$). One end of the molecule has a sulfhydryl group that forms a covalent bond with the metallic substrate, while the carboxy group binds strongly with the resin. Thus, the role of the alkanethiol used in this example is one of a coupling agent.

EXAMPLE 7

In this example, another bifunctional alkanethiol was used to coat an elctrogalvanized CRS panel. A 5% by volume 3-mercaptopropyltrimethoxysilane (MPS) solution was prepared in a 50:50 ethanol-water mixture, and then agitated for 4 hours to allow for the reagent to be partially hydrolyzed. An EG steel panel with dimensions of 12×7.5 cm was then immersed in the solution for 10 minutes, and dried in an oven at 150° C. for 10 min. The sulhydryl group of MPS forms covalent bonds with the zinc on the substrate, while the silyloxy group of the adsorbed MPS undergoes cross-linking polymerization by forming Si—O—Si linkages. Although the hydrocarbon chain of the MPS is short, the cross-linking polymerization between the terminal groups would provide a robust coating on the surface and provides a barrier effect.

The EG steel panel coated with MPS was subjected to salt spray test along with an untreated panel. After 48 hours of salt spray test, the untreated panel rested, while the MPS-coated panel showed no sign of rust. These results demonstrated the effectiveness of using polymerizable bifunctional alkanethiols for corrosion inhibition for galvanized CRS steel. A mercaptosilane with a longer alkane chain should give better corrosion protection.

EXAMPLE 8

In this example, phosphated EG steel panels were coated with ODT to render the surfaces hydrophobic, which is a desirable feature for fingerprint-free steels. Panels with dimensions of 12×7.5 cm were immersed in 5- to 70-mM ODT solutions for 5 minutes, dried under a gentle stream of dry nitrogen, and then cured in an oven at 120° C. for 5 minutes. The hydrophobicity of the coated samples was determined by measuring water contact angles using the sessile drop technique. The results are given in Table 2. The contact angles of the ODT-coated panels were in the range of 133 to 144 o over the range of concentrations investigated. In contrast, the phosphated EG steel without ODT coating was 0°. Also shown in Table 2 for comparison is the contact angle (87°) of a fingerprint-free CRS sheet produced commercially. Thus, coating phosphated steel with alkanethiols with terminal methyl groups may be useful for producing fingerprint-free steel without a polymer coating.

The salt spray tests conducted on the ODT-coated steel panels showed corrosion resistance for 36 to 52 hours, as compared to 8 to 12 hours for untreated phosphated EG steel. The polymer coated panel lasted 106 to 128 hours, which may be attributed to the fact that the polymeric resin coating was much thicker than the ODT coatings.

TABLE 2

Effects of Coating Phosphated EG Steel with ODT

| Treatment | | Water Contact Angle (degrees) | Corrosion Resistance (SST Hours) | Corrosion Current ($\mu A/cm^2$) |
|---|---|---|---|---|
| Untreated | | 0 | 8-12 | 9.20 |
| ODT Coatings | 0.005 M | 139 | | |
| | 0.01 M | 142 | | |
| | 0.02 M | 144 | 36-52 | 1.23 |
| | 0.04 M | 144 | | |
| | 0.05 M | 138 | | |
| | 0.07 M | 133 | | |
| Anti-fingerprinted Steel | | 87 | 106-128 | |

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A process of providing corrosion protection for a metal by coating said metal with a thiol compound, comprising:
    a. dissolving or dispersing said thiol compound in a solvent and preparing a solution or dispersion including 20 to 50 mM of the thiol compound,
    b. treating said metal with said solution or dispersion in the range of 3 to 11 seconds,
    c. drying or curing the treated metal, wherein a coating consisting essentially of said thiol compound is formed directly on the metal surface, and thereby increasing the corrosion resistance of said metal without using chrome, and
    wherein said metal is selected from the group consisting of hot rolled steel sheet, cold-rolled steel sheet, hot-dipped metallic coated steel sheets, electroplated metallic coated steel sheets, aluminum sheets, aluminum alloy sheets, zinc sheets, and zinc alloy sheets and said metal includes coatings of one or more layers selected from the group consisting of lead, lead alloy, nickel, nickel alloy, tin and tin alloy.

2. A process according to claim 1 wherein said thiol compound has the general formula, $R(CH_2)_n SH$, where R is selected from the group consisting of methyl, carboxyl, hydroxyl, formyl, and amide, and n is in the range of 7 to 21.

3. A process according to claim 1 wherein said thiol compound is 1-octadecanethiol.

4. A process according to claim 1 wherein said solvent is selected from the group consisting of alcohols, glycols, acetone, toluene, ethyl acetate, hexane, furan, tetrahydrofuran (THF), methylene chloride, ethers, formic acid, formamide, N,N-dimethyl formamide, acetonitrile, alkanes, turpentine, benzene, butyl acetate, petroleum ester, xylene, carbon tetrachloride, mineral spirits, and water; and combinations thereof.

5. A process according to claim 4 wherein said solvent is selected from the group consisting of ethanol, 1-propanol, 1-butanol, and mixtures thereof.

6. A process according to claim 1 wherein said metal substrate is coated with said solution or dispersion by using a means selected from the group consisting of immersion, spray, painting, roll coating, and flow coating.

7. A process according to claim 1, wherein said metal is coated with said solution or dispersion by immersion.

8. A process of providing corrosion protection for a galvanized steel by coating said steel with a thiol compound, comprising:

a. dissolving or dispersing said thiol compound in a solvent and preparing a solution or dispersion including 20 to 50 mM of the thiol compound,
   b. treating said galvanized steel with said solution or dispersion in the range of 3 to 11 seconds, wherein said steel includes coatings of one or more layers selected from the group consisting of lead, lead alloy, nickel, nickel alloy, tin and tin alloy,
   c. drying or curing the treated galvanized steel, wherein a coating consisting essentially of said thiol compound is formed directly on said galvanized steel and thereby increasing the corrosion resistance of said galvanized steel without using chrome.

9. A process according to claim 8 wherein said galvanized steel is electro-galvanized.

* * * * *

UNITED STATES PATENT AND TRADEMARK OFFICE
CERTIFICATE OF CORRECTION

PATENT NO. : 7,524,535 B2
APPLICATION NO. : 10/786379
DATED : April 28, 2009
INVENTOR(S) : Hyung-Joon Kim et al.

It is certified that error appears in the above-identified patent and that said Letters Patent is hereby corrected as shown below:

On the Title Page, Item (75), under "Inventors", line 4, delete "Roy Hoan Yoon" and insert -- Roe-Hoan Yoon --, therefor.

In column 10, line 60, in Claim 2, delete "$R(CH_2)_n$ SH," and insert -- $R(CH_2)_nSH$, --, therefor.

In column 10, line 64, in Claim 3, delete "1 -octadecanethiol." and insert -- 1-octadecanethiol. --, therefor.

Signed and Sealed this

Eighteenth Day of August, 2009

David J. Kappos
*Director of the United States Patent and Trademark Office*